Figure 1:
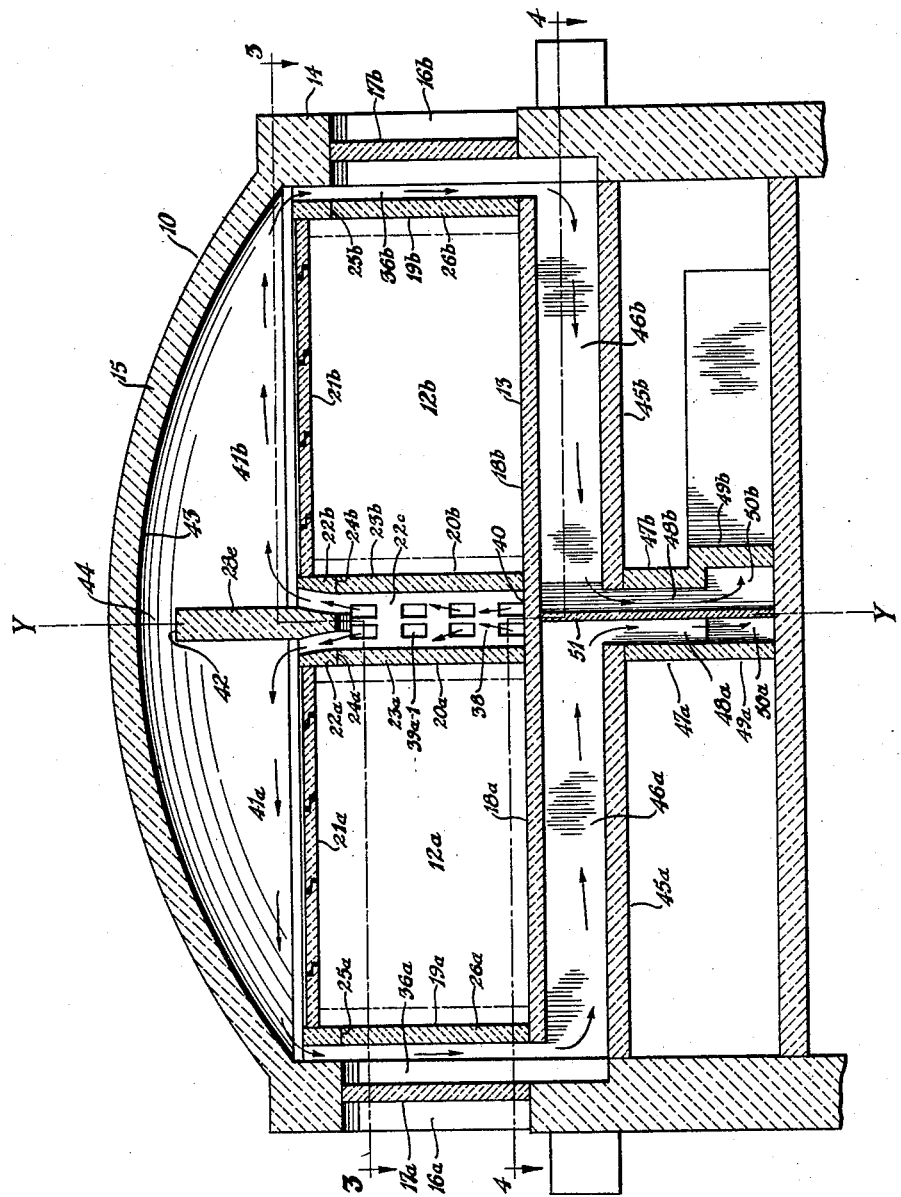

Nov. 8, 1932.  L. W. MANION  1,886,491
MUFFLE KILN
Filed Oct. 7, 1931  4 Sheets-Sheet 1

INVENTOR
Leo W. Manion
BY
Frease and Bishop ATTORNEYS

Nov. 8, 1932.  L. W. MANION  1,886,491

MUFFLE KILN

Filed Oct. 7, 1931  4 Sheets-Sheet 3

INVENTOR
BY Leo W. Manion
Frease and Bishop ATTORNEYS

Patented Nov. 8, 1932

1,886,491

UNITED STATES PATENT OFFICE

LEO W. MANION, OF CANTON, OHIO

MUFFLE KILN

Application filed October 7, 1931. Serial No. 567,405.

My invention relates to kilns adapted for burning clay, shale, and other ceramic products, including brick, tile, and the like, by the use of indirect heat, and particularly adapted for burning glazed ceramic products by the use of indirect heat.

In the usual kiln used for burning brick, tile, and the like, the distribution of the heat throughout the burning chamber is not uniform, and the products being burned are subject to the direct action of the burning or heating medium, resulting in the case of glazed products, in a burned product having non-uniform surfaces.

Moreover, in the usual kiln the total quantity of heat available in the burning or heating medium is utilized to a relatively limited degree.

The objects of the present improvements include the provision of a kiln adapted for burning ceramic products, in which the products being burned are not subject to the direct action of the burning or heating medium, in which the total mass of products being burned is subject to a substantially uniformly distributed heat, in which a greater quantity of the total heat content of the heating medium is utilized than in ordinary kilns, in which the heating medium may be controlled, and in which the interior is easily accessible for charging the green products and emptying the burned products.

The foregoing and other objects are attained by the kiln structure, parts, improvements, and combinations, which comprise the present invention, and which are particularly and distinctly pointed out and set forth in the appended claims forming part hereof.

In general terms the improved muffle kiln hereof includes walls forming an outer chamber, and walls forming preferably two inner chambers, each inner chamber being located within the outer chamber and being spaced therefrom and from the other inner chamber, the outer chamber preferably including a circular bottom wall, a cylindric side wall, and a dome top wall, and each inner chamber including a segmental bottom wall which may comprise a part of the bottom wall of the outer chamber, side walls including a semi-cylindric wall connecting at its ends with a straight vertical wall, and a preferably removable top wall, the semi-cyclindric wall of each inner chamber being spaced from the inner surface of the preferably cylindric side wall of the outer chamber, and the straight vertical walls of the preferably two inner chambers being spaced from each other centrally with respect to the outer chamber, walls forming preferably a plurality of combustion chambers for each inner chamber, and walls forming communicating flues extending from the combustion chambers beneath the bottom wall of each inner chamber, thence between the central spaced straight vertical side walls of the inner chambers and between the outer surface of each semi-cylindric wall of each inner chamber and the opposite inner surface of the cylindric side wall of the outer chamber, thence across the top of each inner chamber, thence through a downtake flue for each inner chamber, thence through a preferably horizontal exhaust flue below each inner chamber, and thence to an exhaust stack.

Figure 2:
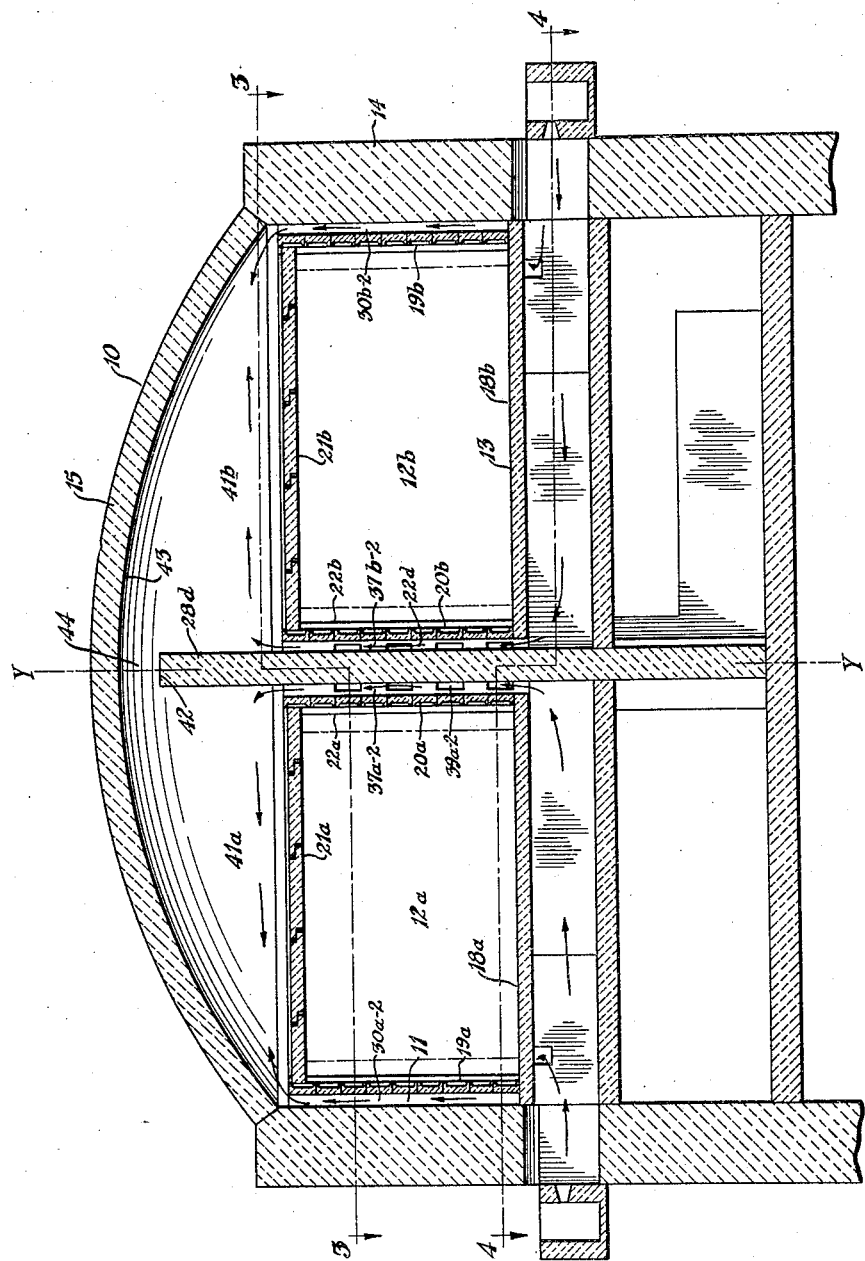
Figure 3:
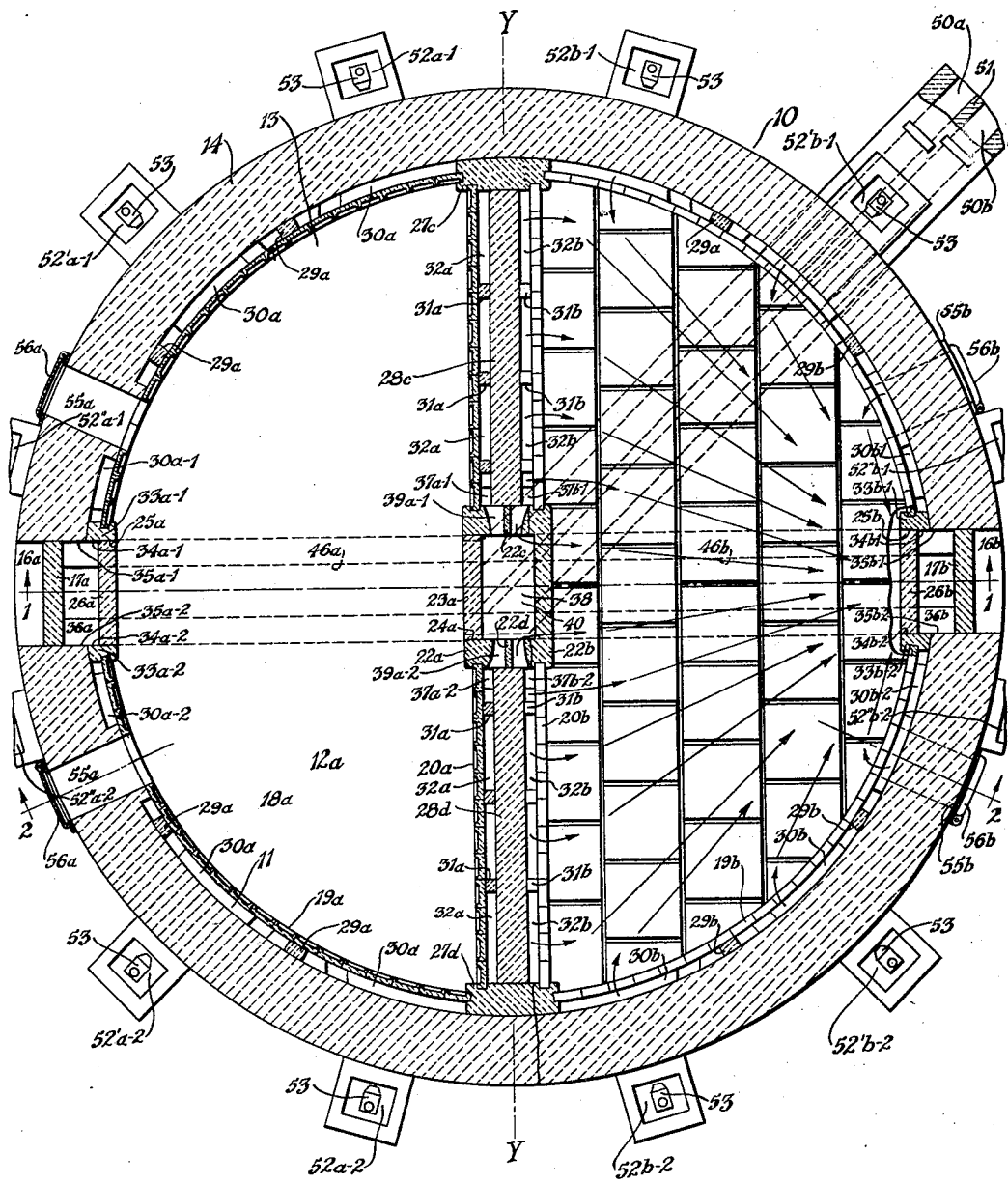
Figure 4:
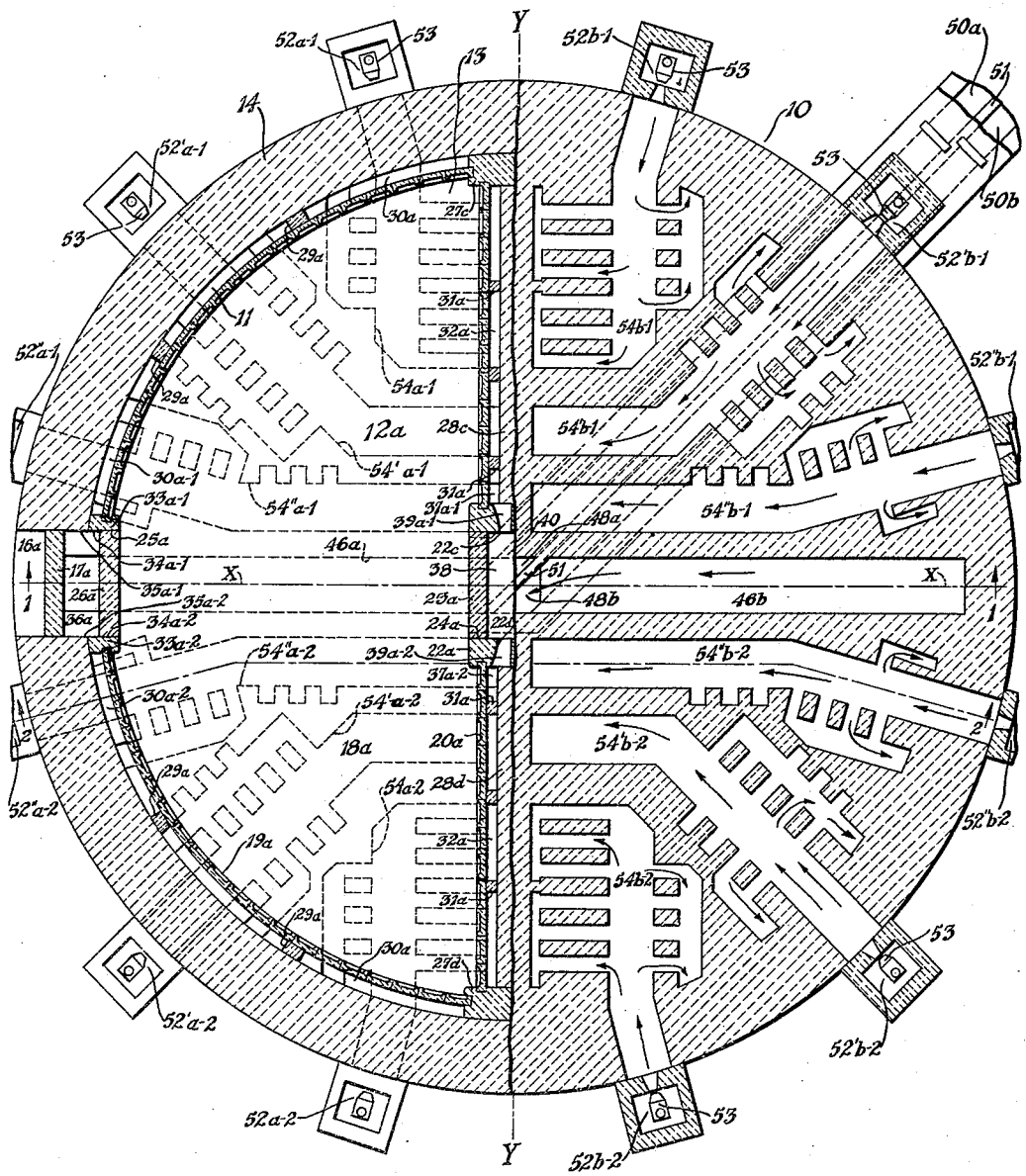

A preferred embodiment of the present improvements is illustrated in the accompanying drawings forming part hereof, in which Figure 1 is a vertical sectional view of the improved kiln, as on lines 1—1, Figs. 3 and 4;

Fig. 2, a similar sectional view thereof, as on lines 2—2, Figs. 3 and 4;

Fig. 3, a horizontal sectional view thereof, as on lines 3—3, Figs. 1 and 2; and Fig. 4, a horizontal sectional view thereof, as on lines 4—4, Figs. 1 and 2.

Similar numerals refer to similar parts throughout the several views.

The improved muffle kiln is indicated generally by 10 and includes walls forming an outer chamber indicated generally by 11, and walls forming preferably two inner chambers indicated generally respectively by 12a and 12b.

The inner chamber walls are located within the outer chamber walls and are spaced therefrom and from each other in a novel manner as will hereinafter be set forth in greater detail.

The walls forming the outer chamber 11 preferably include a circular bottom wall 13 connecting at its outer periphery with a cylindric side wall 14 extending upwardly and downwardly from the bottom wall, and a dome top wall 15 provides a closure for the upper end of the cylindric side wall 14.

The side wall 14 has preferably formed therein diametrically opposite doorway openings 16a and 16b through which access may be had to the inner chambers as will be hereinafter set forth in greater detail.

As illustrated, closure walls 17a and 17b have been built up respectively in the doorway openings 16a and 16b for the reason that the drawings illustrate the arrangement and relationship of the various kiln walls and other parts when a charge is being fired, the charge being illustrated only in dot-dash lines in both of the inner muffled chambers 12a or 12b in order that the structure and arrangement of the improved kiln may be more clearly shown.

The walls forming the inner chamber 12a include a segmental bottom wall 18a which as illustrated comprises a part of the bottom wall 13 of the outer chamber 11.

Side walls extend upwardly from the outer periphery of the bottom wall 18a and include a semi-cylindric wall 19a connecting at its ends with a straight vertical wall 20a.

The inner chamber 12a is completed by a preferably removable top wall 21a.

Similarly the walls forming the inner chamber 12b include a segmental bottom wall 18b which as illustrated comprises a part of the bottom wall 13 of the outer chamber 11.

Side walls extend upwardly from the outer periphery of the bottom wall 18b, and include a semi-cylindric wall 19b connecting at its ends with a straight vertical wall 20b.

The inner chamber 12b is preferably completed by a preferably removable top wall 21b.

The semi-cylindric wall 19a of the inner chamber 12a is spaced from one substantially semi-cylindric portion of the inner surface of the cylindric wall 14 of the outer chamber 11; and similarly the semi-cylindric wall 19b of the inner chamber 12b is spaced from the other substantially semi-cylindric portion of the inner surface of the cylindric wall 14 of the outer chamber 11.

The straight vertical walls 20a and 20b are preferably parallel with each other and on opposite sides of and parallel with a vertical diametral plane Y—Y of the outer chamber 11.

As best illustrated in Figs. 3 and 4 the central rectangular sections 22a and 22b respectively of the walls 20a and 20b are greater in thickness than the other portions of the wall, for providing structural strength, and for forming a door frame with walls 22c and 22d extending vertically and transversely between the walls 22a and 22b.

As illustrated closure walls 23a and 23b have been built up respectively in the doorway openings 24a and 24b of the wall sections 22a and 22b, which doorway openings are opposite each other and alined with doorway openings 25a and 25b formed respectively in the cylindric walls 19a and 19b, and with the doorway openings 16a and 16b of the outer chamber cylindric wall 14.

The doorway openings 25a and 25b have closure walls 26a and 26b built up therein as illustrated.

Accordingly, when the several closure walls are removed from the several alined doorways, access may be had with either of the inner chambers 12a or 12b through either of the doorway openings 16a or 16b for the outer chamber.

Columns 27c and 27d are preferably located diametrically opposite each other against the inner surface of the cylindric wall 14, and the columns 27c and 27d extend between the walls 20a and 20b whose outer ends terminate in the columns 27c and 27d, and the outer ends of the semi-cylindric walls 19a and 19b likewise terminate in the columns 27c and 27d.

A central vertical flue forming wall 28c extends between the column 27c and the wall 22c, and the wall 28c is parallel with and spaced from the opposite portions of the walls 20a and 20b.

Similarly, a central vertical flue forming wall 28d extends between the wall 22d and the column 27d, and the wall 28d is parallel with and spaced from the opposite portions of the walls 20a and 20b.

An arch wall section 28e connects the upper inner ends of the walls 28c and 28d between and above the walls 22c and 22d.

A plurality of circumferentially spaced partition posts 29a are interposed between the semi-cylindric wall 19a and the cylindric wall 14, forming a plurality of arcuate upwardly extending flues 30a, one wall of each of which is formed by the semi-cylindric wall 19a.

For similar purposes, a plurality of spaced partition posts 31a are interposed between the wall 28c and the opposite portions of the wall 20a, and between the wall 28d and the opposite portions of the wall 20a, forming a plurality of upwardly extending flues 32a, one wall of each of which is formed by the wall 20a.

Similarly, a plurality of circumferentially spaced partition posts 29b are interposed between the semi-cylindric wall 19b and the cylindric wall 14, forming a plurality of arcuate upwardly extending flues 30b, one wall of each of which is formed by the semi-cylindric wall 19b.

For similar purposes a plurality of spaced partition posts 31b are interposed between the wall 28c and the opposite portions of the wall 20b, and between the wall 28d and the opposite portions of the wall 20b, forming a plurality of upwardly extending flues 32b, one wall of each of which is formed by the wall 20b.

As illustrated, the doorway opening 25a is formed in a frame interposed in the wall 19a and including side posts 33a—1 and 33a—2, and the side posts 33a—1 and 33a—2 extend between the wall 19a and the wall 14 and form therewith as illustrated, uptake flues 30a—1 and 30a—2 at each side of the doorway opening 25a.

Opposite faces 34a—1 and 34a—2 of the side posts 33a—1 and 33a—2 respectively are parallel with each other and alined respectively with the parallel side faces 35a—1 and 35a—2 of the doorway opening 16a, and these alined opposite side faces form with the opposite parallel faces of the closure walls 17a and 26a, the inner faces of a vertically extending downtake flue 36a.

Similarly the doorway opening 25b is formed in a frame interposed in the wall 19b and including side posts 33b—1 and 33b—2, and the side posts 33b—1 and 33b—2 extend between the wall 19b and the wall 14 and form therewith as illustrated, uptake flues 30b—1 and 30b—2 at each side of the doorway opening 25b.

Opposite faces 34b—1 and 34b—2 of the side posts 33b—1 and 33b—2 respectively are parallel with each other and alined respectively with the parallel side faces 35b—1 and 35b—2 of the doorway opening 16b, and these alined opposite side faces form with the opposite parallel faces of the closure walls 17b and 25b, the inner faces of a vertically extending downtake flue 36b.

A flue 37a—1 is formed at one side of the doorway 24a by the wall 22c, portions of the wall 20a, one of the partition posts 31a, and portions of the wall 28c; and a flue 37a—2 is formed at the other side of the doorway 24a by the wall 22d, portions of the wall 20a, one of the partition posts 31a, and portions of the wall 28d.

Similarly, a flue 37b—1 is formed at one side of the doorway 24b by the wall 22d, portions of the wall 20b, one of the partition posts 31b, and portions of the wall 28c; and a flue 37b—2 is formed at the other side of the doorway 24b by the wall 22d, portions of the wall 20b, one of the partition posts 31b, and portions of the wall 28d.

A central heating chamber 38 is formed by the central portion 40 of the bottom wall 13 closing the lower ends of the opposite parallel wall sections 22a and 22b and the opposite parallel walls 22c and 22d which extend between the wall sections 22a and 22b.

The wall 22c has formed therein horizontally extending apertures 39a—1 communicating between the flue 37a—1 and the chamber 38; and the wall 22d has formed therein horizontally extending apertures 39a—2 communicating between the flue 37a—2 and the chamber 38.

An upper circulating chamber 41a is formed between the upper wall 21a for the inner chamber 12a, the opposite portions of the dome wall 15 and one side of the upper ends of the walls 28c, 28d, and 28e; and an upper circulating chamber 43b is formed between the upper wall 21b for the inner chamber 12b, opposite portions of the dome wall 15, and the other side of the upper ends of the walls 28c, 28d, and 28e.

The tops of the walls 28c, 28d, and 28e terminate in a common upper face 42 located below the under face 43 of the dome or crown wall 15, thereby forming an opening 44 communicating between the circulating chambers 41a and 41b.

The upper ends of the several flues 30a, 30a—1, 30a—2, 32a, and one side of the upper end of the central heating chamber 38 communicate with the upper circulating chamber 41a.

Similarly, the upper ends of the several flues 30b, 30b—1, 30b—2, 32b, and the other side of the upper end of the central heating chamber 38 communicate with the upper circulating chamber 41b.

Likewise, the upper end of the downtake flue 36a communicates with the upper circulating chamber 41a, and as illustrated the downtake flue 36a is preferably located on the outside of the semi-cylindric wall 19a and midway between the ends of the vertical wall 20a.

Similarly, the upper end of the downtake flue 36b communicates with the upper circulating chamber 41b, and as illustrated the downtake flue 36b is preferably located on the outside of the semi-cylindric wall 19b and midway between the ends of the vertical wall 20b.

Walls indicated generally by 45a form a preferably horizontal exhaust and heater flue 46a beneath the inner chamber 12a, and the walls 45a forming the flue 46a preferably include portions of the segmental bottom wall 18a of the inner chamber 12a, which as aforesaid comprises a part of the bottom wall 13 of the outer chamber 11.

The outer end of the flue 46a communicates with the lower end of the downtake flue 36a.

Walls indicated generally by 47a form a central vertically extending intermediate exhaust flue 48a which communicates at its upper end with the inner end of the flue 46a; and walls indicated generally by 49a form a diagonally extending preferably horizontal exhaust flue 50a which communicates at its inner end with the lower end of the intermediate flue 48a, and which extends beyond the kiln to an exhaust stack, not shown.

Similarly, walls indicated generally by 45b form a preferably horizontal exhaust and heater flue 46b beneath the inner chamber 12b, and the walls 45b forming the flue 46b preferably include portions of the segmental bottom wall 18b of the inner chamber 12b, which as aforesaid comprises a part of the bottom wall 13 of the outer chamber 11.

The outer end of the flue 46b communicates with the lower end of the downtake flue 36b.

Walls indicated generally by 47b form a central vertically extending intermediate exhaust flue 48b which communicates at its upper end with the inner end of the flue 46b; and walls indicated generally by 49b form a diagonally extending preferably horizontal exhaust flue 50b which communicates at its inner end with the lower end of the intermediate flue 50b, and which extends beyond the kiln to an exhaust stack, not shown.

As illustrated, the walls 47a and 47b forming the intermediate exhaust flues 48a and 48b include a common partition wall 51, and the partition wall 51 extends and forms a common end closure for the exhaust and heater flues 46a and 46b, and the common partition wall 51 furthermore extends and forms a common partition wall of the walls 49a and 49b forming the flues 50a and 50b, respectively.

By the foregoing construction and arrangement of the kiln 10, heating medium introduced into the lower ends of the several flues 30a, 30a—1, 30a—2, 32a, 37a—1, and 37a—2 flows upwardly about the walls 19a and 20a, transferring heat to these walls and thence to the charge within the chamber 12a, and the heating medium furthermore flows from the flues 37a—1 and the flues 37a—2 respectively through the horizontal apertures 39a—1 and 39a—2 into the central heating chamber 38, and the heating medium then flows out of the upper ends of all of the aforesaid flues 30a, 30a—1, 30a—2, 32a, 37a—1 and and 37a—2, and out of the upper end of the central heating chamber 38, into the upper circulating chamber 41a, and flows therein over the top wall 21a into the upper end of the downtake flue 36a, the curvature of the inner surface of the wall 14, and the curvature of the under face 43 of the dome or crown wall 15 serving to deflect the heating medium towards the centrally located upper end of the downtake flue 36a, and the heating medium flows downwardly through the flue 36a into the horizontal exhaust and heating flue 46a and thence through the intermediate exhaust flue 48a into the exhaust flue 50a which delivers the heating medium to an exhaust stack not shown.

This flow of heating medium about the side walls and over the top wall of the inner chamber 12a is illustrated in the drawings by the arrows, and a similar flow of heating medium takes place about the side and top walls of the chamber 12b.

The present invention furthermore includes means for simultaneously heating the bottom wall and supplying a variable quantity of heating medium to the aforesaid flues and circulating chambers about the sides and top wall of each inner chamber.

The combined bottom wall heating and heat supply means for the sides and top walls of each inner chamber, include for the inner chamber 12a, walls forming a plurality of combustion chambers 52a—1, 52′a—1, 52″a—1, 52″a—2, 52′a—2, and 52a—2.

The source of heat for each combustion chamber as illustrated is an oil burner 53.

Walls including portions of the bottom wall 18a form a labyrinthian flue indicated generally by 54a—1 below the bottom wall 18a, and the combustion chamber 52a—1 communicates with the outer end of the labyrinthian flue 54a—1, and the labyrinthian flue 54a—1 communicates with the lower end of one of the flues 30a and with the lower ends of a plurality of the flues 32a.

Walls including portions of the bottom wall 18a form a labyrinthian flue indicated generally by 54a—2 below the bottom wall 18a, and the combustion chamber 52a—2 communicates with the outer end of the labyrinthian flue 54a—2 and the labyrinthian flue 54a—2 communicates with the lower end of one of the flues 30a and with the lower ends of a plurality of the flues 32a.

As best illustrated in Fig. 4, the combustion chamber 52a—1 and its labyrinthian flue 54a—1 are symmetrical about the axis X—X with the combustion chamber 52a—2 and its labyrinthian flue 54a—2.

Walls including portions of the bottom wall 18a form a labyrinthian flue indicated generally by 54′a—1 below the bottom wall 18a, and the combustion chamber 52′a—1 communicates with the outer end of the labyrinthian flue 54′a—1, and the labyrinthian flue 54′a—1 communicates with the lower end of one of the flues 30a and with the lower end of one of the flues 32a.

Walls including portions of the bottom wall 18a form a labyrinthian flue indicated generally by 54′a—2 below the bottom wall 18a, and the combustion chamber 52′a—2 communicates with the outer end of the labyrinthian flue 54′a—2, and the labyrinthian flue 54′a—2 communicates with the lower end of one of the flues 30a and with one of the flues 32a.

As best illustrated in Fig. 4, the combustion chamber 52′a—1 and its labyrinthian flue 54′a—1 are symmetrical about the axis X—X with the combustion chamber 52′a—2 with its labyrinthian flue 54′a—2.

Walls including portions of the bottom wall 18a form a labyrinthian flue indicated generally by 54″a—1 below the bottom wall 18a and the combustion chamber 52″a—1 communicates with the outer end of the labyrinthian flue 54″a—1, and the labyrinthian flue 54″a—1 communicates with the lower end of the flue 30a—1 and with the lower end of the flue 37a—1.

Walls including portions of the bottom wall 18a form a labyrinthian flue indicated generally by 54″a—2 below the bottom wall 18a and the combustion chamber 52″a—2 communicates with the outer end of the labyrinthian flue 54″a—2, and the labyrinthian flue 54″a—2 communicates with the lower end of the flue 30a—2 and with the lower end of the flue 37a—2.

As best illustrated in Fig. 4 the combustion chamber 52″a—1 and its labyrinthian flue 54″a—1 are symmetrical about the axis X—X with the combustion chamber 52″a—2 and its labyrinthian flue 54″a—2.

Walls including portions of the bottom wall 18b form a labyrinthian flue indicated generally by 54b—1 below the bottom wall 18b, and the combustion chamber 52b—1 communicates with the outer end of the labyrinthian flue 54b—1, and the labyrinthian flue 54b—1 communicates with the lower end of one of the flues 30b and with the lower ends of a plurality of the flues 32b.

Walls including portions of the bottom wall 18b form a labyrinthian flue indicated generally by 54b—2 below the bottom wall 18b, and the combustion chamber 52b—2 communicates with the outer end of the labyrinthian flue 54b—2, and the labyrinthian flue 54b—2 communicates with the lower end of one of the flues 30b and with the lower ends of a plurality of the flues 32b.

As best illustrated in Fig. 4, the combustion chamber 52b—1 and its labyrinthian flue 54b—1 are symmetrical about the axis X—X with the combustion chamber 52b—2 and its labyrinthian flue 54b—2.

Walls including portions of the bottom wall 18b form a labyrinthian flue indicated generally by 54′b—1 below the bottom wall 18b, and the combustion chamber 52′b—1 communicates with the outer end of the labyrinthian flue 54′b—1, and the labyrinthian flue 54′b—1 communicates with the lower end of one of the flues 30b and with the lower end of one of the flues 32b.

Walls including portions of the bottom wall 18b form a labyrinthian flue indicated generally by 54′b—2 below the bottom wall 18b, and the combustion chamber 52′b—2 communicates with the outer end of the labyrinthian flue 54′b—2, and the labyrinthian flue 54′b—2 communicates with the lower end of one of the flues 30b and with one of the flues 32b.

As best illustrated in Fig. 4, the combustion chamber 52′b—1 and its labyrinthian flue 54′b—1 are symmetrical about the axis X—X with the combustion chamber 52′b—2 with its labyrinthian flue 54′b—2.

Walls including portions of the bottom wall 18b form a labyrinthian flue indicated generally by 54″b—1 below the bottom wall 18b and the combustion chamber 52″b—1 communicates with the outer end of the labyrinthian flue 54″b—1, and the labyrinthian flue 54″b—1 communicates with the lower end of the flue 30b—1 and with the lower end of the flue 37b—1.

Walls including portions of the bottom wall 18b form a labyrinthian flue indicated generally by 54″b—2 below the bottom wall 18b and the combustion chamber 52″b—2 communicates with the outer end of the labyrinthian flue 54″b—2, and the labyrinthian flue 54″b—2 communicates with the lower end of the flue 30b—2 and with the lower end of the flue 37b—2.

As best illustrated in Fig. 4 the combustion chamber 52″b—1 and its labyrinthian flue 54″b—1 are symmetrical about the axis X—X with the combustion chamber 52″b—2 and its labyrinthian flue 54″b—2.

One or more doorway frames 55a, each fitted with a door 56a, are provided in the walls 14 and 19a; and similarly one or more doorway frames 55b, each fitted with a door 56a, are provided in the walls 14 and 19b, for permitting water smoking of the chambers 12a and 12b.

Accordingly, by the foregoing arrangement of the combustion chambers and flues, each combustion chamber provides heat for a sectoral zone of the inner chamber heated thereby, and the heat supply for each combustion chamber may be varied so as to regulate the heat in the several sectoral zones of each inner chamber, whereby a uniform distribution of heat may be attained in each inner chamber.

I claim:

1. A kiln including walls forming an outer chamber, walls forming two inner chambers, each inner chamber being located within the outer chamber and being spaced therefrom and from the other inner chamber, the walls forming the outer chamber including a bottom wall, curved side walls, and a top wall, and the walls forming each inner chamber including a segmental bottom wall, side walls including a curved wall and a substantially straight wall connected at their ends with each other, the curved wall of each inner chamber being spaced from opposite portions of the inner surface of the curved side walls of the outer chamber, and the substantially straight walls of the two inner chambers being spaced from each other and being located centrally with respect to the outer chamber, the top of each inner chamber being spaced below the top wall of the outer chamber and there being formed a circulating chamber therebetween, walls forming a downtake flue for each inner chamber, the upper end of each downtake flue communicating with the adjacent circulating chamber, and means for introducing a supply of heating medium between the spaced walls forming the outer and inner chambers at the lower ends thereof.

2. A kiln including walls forming an outer chamber, walls forming two inner chambers, each inner chamber being located within the outer chamber and being spaced therefrom and from the other inner chamber, the walls forming the outer chamber including a bottom wall, curved side walls, and a top wall, and the walls forming each inner chamber including a segmental bottom wall, side walls including a curved wall and a wall connecting the ends of the curved wall, the curved wall of each inner chamber being spaced from opposite portions of the inner surface of the curved side walls of the outer chamber, and the connecting walls of the two inner chambers being spaced from each other and being located centrally with respect to the outer chamber, the top of each inner chamber being spaced below the top wall of the outer chamber and there being formed a circulating therebetween, walls forming a downtake flue for each inner chamber, the upper end of each downtake flue communicating with the adjacent circulating chamber, and means for introducing a supply of heating medium between the spaced walls forming the outer and inner chambers at the lower ends thereof.

3. A kiln including walls forming an outer chamber, walls forming two inner chambers, each inner chamber being located within the outer chamber and being spaced therefrom and from the other inner chamber, and walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, and means for introducing a supply of heating medium between the spaced side walls of the chambers at the lower ends thereof.

4. A kiln including walls forming an outer chamber, walls forming two inner chambers, each inner chamber being located within the outer chamber and being spaced therefrom and from the other inner chamber, the walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, walls forming a heater flue beneath the bottom wall of each inner chamber, there being formed an exhaust opening for each heater flue between opposite spaced side walls of the chambers at the lower ends thereof, and means for introducing a supply of heating medium into each heater flue.

5. A kiln including walls forming an outer chamber, walls forming two inner chambers, each inner chamber being located within the outer chamber and being spaced therefrom and from the other inner chamber, the walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, walls forming a heater flue beneath the bottom wall of each inner chamber, there being formed an exhaust opening for each heater flue between the spaced side walls of the inner and outer chambers at the lower ends thereof, and there being formed another exhaust opening for each heater flue between the spaced side walls of the inner chambers at the lower ends thereof, and means for introducing a supply of heating medium into each heater flue.

6. A kiln including walls forming an outer chamber, walls forming two inner chambers, each inner chamber being located within the outer chamber and being spaced therefrom and from the other inner chamber, the walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, walls forming a heater flue beneath the bottom wall of each inner chamber, there being formed an exhaust opening for each heater flue between the opposite spaced side walls of the inner chambers at the lower ends thereof, and means for introducing a supply of heating medium into each heater flue.

7. A kiln including walls forming an outer chamber, walls forming two inner chambers, each inner chamber being located within the outer chamber and being spaced therefrom and from the other inner chamber, the walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, walls forming a plurality of heater flues beneath the bottom wall of each inner chamber, there being formed an exhaust opening for each heater flue between opposite spaced side walls of the chambers at the lower ends thereof, and means for introducing a supply of heating medium into each heater flue.

8. A kiln including walls forming an outer chamber, walls forming two inner chambers, each inner chamber being located within the outer chamber and being spaced therefrom and from the other inner chamber, the walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, walls forming a plurality of heater flues beneath the bottom wall of each inner chamber, there being formed an exhaust opening for each heater flue between the spaced side walls of the inner and outer chambers at the lower ends therof, and there being formed another exhaust opening for each heater flue between the spaced side walls of the inner chambers at the lower ends thereof, and means for introducing a supply of heating medium into each heater flue.

9. A kiln including walls forming an outer chamber, walls forming two inner chambers, each inner chamber being located within the outer chamber and being spaced therefrom and from the other inner chamber, the walls forming the outer chamber including a bottom wall, side walls, and a top wall, and the walls forming each inner chamber including a bottom wall and side walls, portions of the side walls of each inner chamber being spaced from opposite portions of the inner surface of the side walls of the outer chamber, and portions of the side walls of each inner chamber being centrally located and spaced from the centrally located portions of the side walls of the other inner chamber, the top of each inner chamber being spaced below the top wall of the outer chamber and there being formed a circulating chamber therebetween, walls forming an exhaust flue for each circulating chamber, each exhaust flue communicating with its circulating chamber, walls forming a plurality of heater flues beneath the bottom wall of each inner chamber, there being formed an exhaust opening for each heater flue between the opposite spaced side walls of the inner chambers at the lower ends thereof, and means for introducing a supply of heating medium into each heater flue.

In testimony that I claim the above, I have hereunto subscribed my name.

LEO W. MANION.